April 18, 1944.     R. L. SEABURY ET AL     2,347,132
MANUFACTURE OF RED LITHARGE
Filed May 28, 1941     2 Sheets-Sheet 2

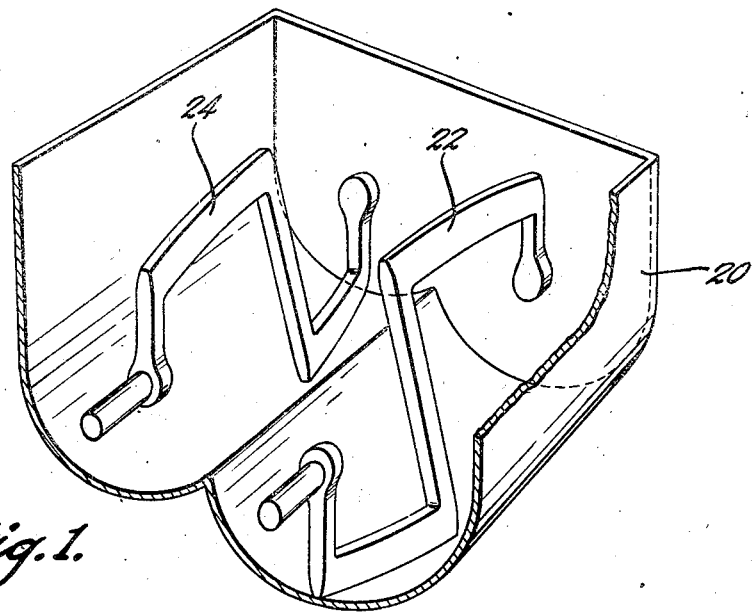
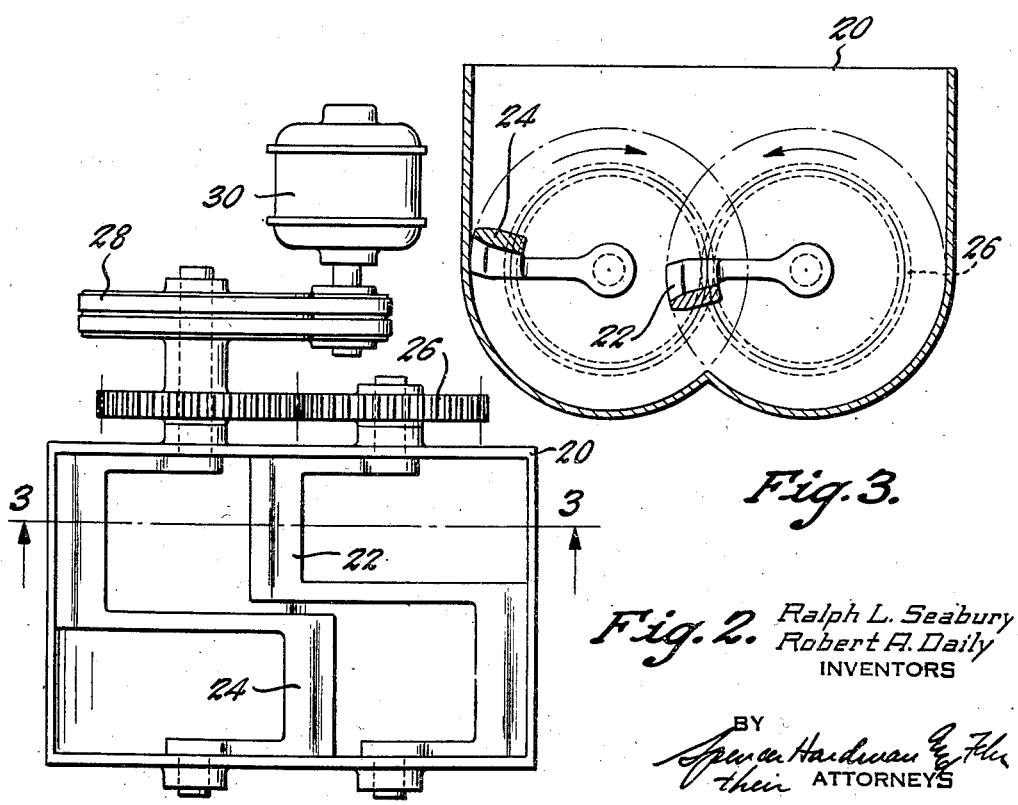

Ralph L. Seabury
Robert A. Daily
INVENTORS

BY
*[signature]*
Their ATTORNEYS

Patented Apr. 18, 1944

2,347,132

UNITED STATES PATENT OFFICE 2,347,132

MANUFACTURE OF RED LITHARGE

Ralph L. Seabury, Anderson, and Robert A. Daily, Muncie, Ind., assignors to General Motors Corporation, Detroit, Mich., a corporation of Delaware Application May 28, 1941, Serial No. 395,674

6 Claims. (Cl. 23—146)

This application is a continuation in part of our copending application, Serial No. 310,554, filed December 22, 1939, and assigned to the assignee of the present application. This invention relates to the manufacture of lead oxide and is particularly concerned with the manufacture of red litharge, as used in the manufacture of paste lead storage batteries.

An object of the invention is to provide a method for converting Barton litharge to substantially pure red litharge wherein the conversion process is inexpensive, rapid to accomplish and produces a product of marked uniformity.

Further objects and advantages of the present invention will be apparent from the following description, reference being had to the accompanying drawings wherein a preferred embodiment of the present invention is clearly shown.

In the drawings:

Fig. 1 is a partial fragmentary view in perspective of the Werner-Pfleiderer mixer;

Fig. 2 is a top view of the mixer shown in Fig. 1;

Fig. 3 is a sectional view taken on the line 3—3 of Fig. 2;

Figure 4:
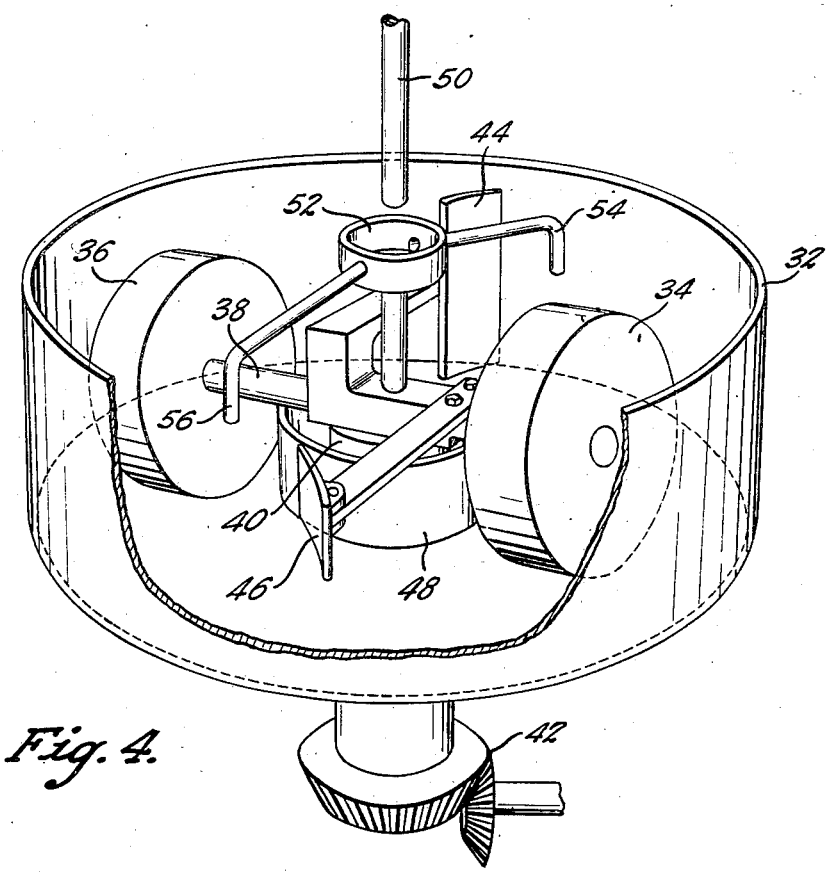
Fig. 4 is a partial fragmentary view in perspective of a Simpson type mixer.

In our copending application we explain the method used in making Barton litharge in a Barton mill wherein the product of the mill comprises what is termed herein "Barton litharge" and which comprises:

|  | Per cent |
|---|---|
| Yellow litharge | 37.5 |
| Red litharge | 37.5 |
| Free metallic lead dust | 25.0 |

This product may obviously vary to some extent but the ingredients mentioned are always present. In the past this Barton litharge was mixed with water to the extent of 10% by weight to form a quantity of hydrated lead compounds of a colloidal character. To this was added a suitable quantity of a desired gravity sulphuric acid which probably formed hydrated and basic sulphate compounds. It is possible that the process also converted some of the yellow litharge to red litharge. The mixture which was in the form of a thick paste was then pasted on the grids which were passed through a curing tunnel. In this curing tunnel at the entrance end thereof the humidity was high and the temperature moderate; as the grids progressed through the tunnel the temperature increased while the humidity decreased to practically zero humidity at the outlet. The intended purpose of the curing process was to cure and dry the paste and to convert free lead to litharge as well as to convert yellow litharge to red litharge. A twenty-four hour period was required in order that these conversions might take place. This conversion period within the curing tunnel did not include a 72-hour period for aging initially required.

After the curing step positive and negative plates were assembled in batteries. The batteries were filled with dilute sulphuric acid and the initial formation was given by passing an electric current through the battery. During the initial formation process the active material on the positive plates became lead peroxide $PbO_2$ and the active material on the positive plate became sponge lead. This initial formation process generally required about 40 hours, this being the time required for converting the material of the positive plate to lead peroxide. Even then not all of the conversion took place during the initial formation. Further conversion probably took place during several cycles of charge and discharge of the battery during service.

It has been our experience in the manufacture of batteries according to the process heretofore described, that regardless of the amount of care taken with the proportions of the ingredients used in the paste mixture that the process did not produce the desired uniformity of product which is desired. We concluded that this lack of uniformity was due to variations in chemical transformation within the curing tunnel. It is therefore an object of the invention to provide for the conversion of the metallic lead and yellow litharge to red litharge prior to the mixing of the paste. In this respect it is possible to provide substantially complete conversion of the product of the Barton mill to red litharge with as little of free metallic lead as possible. By obtaining these conversions before mixing we are able to minimize many of the uncertainties heretofore present in the manufacture of storage batteries. Yellow litharge is undesirable in the cured paste and by effecting the conversion of yellow litharge to red litharge before the plate paste is mixed, we are able to eliminate the uncertainties of the result of the curing process which follows the mixing process. The lead content of the Barton mill was more or less converted to litharge in the old process during the mixing and curing, but the extent to which the lead content was converted was difficult to control and this variation in the conversion of the lead content was a factor which contributed to the lack of uniformity in the storage batteries with respect to performance and life. By providing for the substantial conversion of the lead content to lead oxide before mixing and curing we believe another factor contributing to the uncertainties in the results has been eliminated.

In the present process we are able to convert Barton litharge as hereinbefore described to approximately 92% red litharge with the remainder being free lead. This new litharge we will hereinafter call "converted litharge." One of the advantages that flows from the use of converted litharge in place of litharge containing a mixture of red and yellow litharge and metallic lead is in the substantial reduction in time required for curing and baking the paste plates. By the conversion of yellow litharge to red litharge before mixing we have found it possible to reduce the time of curing from 24 hours to a period of from three to four hours. Furthermore, we have eliminated the necessity of aging for 72 hours. Then to, the apparatus required for curing and baking paste plates is much smaller than the curing tunnel required in the old process. Therefore, the new apparatus is less expensive.

Another advantage of our process is that it renders more certain and uniform in effect the use of a subsequent procedure known as "pickling" which procedure results in a material reduction in the time required for initially forming the storage battery plates after they have been assembled in a battery container. This pickling procedure is described and claimed in copending application, Serial No. 310,553, filed December 22, 1939, and also assigned to the assignee of this invention.

Figure 5:
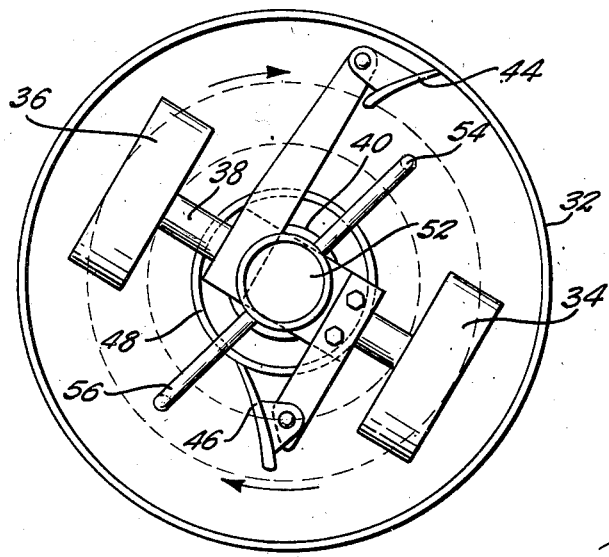
Fig. 5 is a top view of the mixer shown in Fig. 4.

In the present process Barton litharge is supplied to a mixer of the "Werner-Pfleiderer" type, as shown in Figs. 1 through 3, or to a "Simpson" type of mixer, often termed an "edge running mulling mill," as shown in Figs. 4 and 5.

In either case the Barton litharge is added to the mixer together with a limited quantity of water. This water should not exceed 7% by weight since the conversion of the metallic lead is greatly retarded when the moisture content exceeds this figure. We prefer to utilize from ½ to 7% by weight of water with the range of greatest efficiency falling between 1.5 to 3.5% by weight. The Barton litharge and water in the mixer is agitated, kneaded or mulled as the case may be. The conversion of red and yellow litharge under oxidizing conditions, that is to say, in combination with moisture plus the oxygen in the atmosphere is an exothermic reaction producing heat which raises the temperature of the mixture sufficiently without the supply of any external heat to carry the reaction to substantial completion. Thus, we have found that moisture, agitation and the oxygen in the atmosphere will convert the yellow litharge and the free lead to substantially pure red litharge. We have further found that no external heat is required due to the exothermic reaction occurring within the mixture. The water is preferably added gradually and while the mixer is in operation.

We have found that oxidation of one-half of the metallic lead will take place in fifteen minutes, and approximately ⅔ of the conversion of the metallic lead will occur in 30 minutes. The conversion of yellow litharge to red litharge is completed in about five minutes. Longer milling periods while giving more complete conversion of the metallic lead are not believed necessary since when the Barton litharge has been converted to approximately 92% red litharge we have found that it is adequate for use in storage battery plate paste. However, it is to be understood that by the use of longer mixing periods that further conversion can be accomplished.

Referring particularly to Fig. 1, 20 indicates the outer casing of a "Werner-Pfleiderer" type mixer, while 22 and 24 are mixing or kneading blades which are disposed in interlocking relation to one another as shown in Fig. 2. Blades 22 and 24 are driven through suitable gears 26 and belt 28 by a motor 30 and rotate in opposite directions, as shown in Fig. 3. In this manner the litharge in the mixer is thoroughly kneaded and agitated.

The Simpson type mixer, shown in Figs. 4 and 5, is what is often termed an edge running mulling mill and includes a casing 32 which has therein a pair of rollers 34 and 36 which are suitably journaled on an axle 38 which is carried on a central shaft 40 that is driven through suitable gears 42 by a motivating means, not shown. The rolls 34 and 36 traverse a circular path within the casing 32 and a pair of plows or scrapers 44 and 46 are provided attached to the shaft driving the rolls. The scraper 46 removes substantially all material from the inner wall 48 of the casing and scrapes it outwardly into the path of the rolls, while the other scraper 44 performs a similar action on the outer wall of the casing 32. Thus as the rolls 34 and 36 rotate, the plows 44 and 46 constantly scrape the material to be mulled into the path of the rotating rolls 34 and 36. Water added to the litharge in the mixer is supplied from pipe 50 which fills a reservoir 52 that rotates with the rolls. Reservoir 52 has two feed pipes 54 and 56 which drip the water into the litharge in the mixer directly into the path of the rolls.

It is apparent that other types of mixers may be utilized, the only requirement being that the litharge is thoroughly mixed with the water since agitation of the litharge constantly exposes new surfaces thereof to the oxidizing action of the air and likewise provides more uniform contacting of the water with each particle of Barton litharge whereby more complete and uniform conversion is accomplished.

While the embodiments of the present invention as herein disclosed constitute preferred forms, it is to be understood that other forms might be adopted, all coming within the scope of the claims which follow.

We claim:

1. In the process for converting Barton litharge, which comprises a mixture of yellow litharge and red litharge and some metallic lead, to substantially all red litharge, the steps comprising; adding water at substantially room temperature to the Barton litharge in percentages of .5 to 7% of the total weight of the litharge, and then mixing the water and Barton litharge for a time sufficient to cause substantially all of the Barton litharge to be converted to red litharge.

2. In the process of converting Barton litharge, which comprises a mixture of yellow litharge and red litharge and some metallic lead, to substantially all red litharge, the steps comprising; adding water to Barton litharge wherein the water added is in the range of from .5 to 7% of the total weight of the litharge, mixing the water and Barton litharge whereby the mixture is heated by the sole means of the exothermic reaction between the water and the litharge and continuing said mixing for a time sufficient to convert the Barton litharge to substantially pure red litharge.

3. The steps in the process of converting Barton litharge, which comprises a mixture of yellow litharge and red litharge and some metallic lead, to substantially all red litharge, comprising adding water to the Barton litharge in percentages of 1.5 to 3.5% of the total weight of the litharge, mixing the water and Barton litharge whereby the mixture is heated by the sole means of an exothermic reaction between the water and the litharge, and continuing to mix said water and litharge for a time sufficient to cause substantially complete conversion of the Barton litharge to red litharge.

4. The steps in the process of converting Barton litharge, which comprises a mixture of yellow litharge and red litharge and some metallic lead, to substantially all red litharge, comprising; supplying Barton litharge to a mixer, supplying water in quantities of from .5 to 7% to said mixer, kneading the water and Barton litharge together for heating the mixture by the sole means of an exothermic reaction between the starting products thereof, and continuing said kneading until substantially all of the Barton litharge has been converted to red litharge.

5. The steps in the process of converting Barton litharge, which comprises a mixture of yellow litharge and red litharge and some metallic lead, to substantially all red litharge, comprising; supplying Barton litharge and water in quantities of from .5 to 7% to an edge runner mill, mulling said mixture for causing an exothermic reaction to occur which heats the mixture and continuing said mulling until substantially all of the Barton litharge has been converted to red litharge.

6. The process of converting Barton litharge, which comprises a mixture of yellow litharge and red litharge and some metallic lead to substantially all red litharge, the steps comprising; mixing Barton litharge under oxidizing conditions with water in percentages of .5 to 7% of the total weight of the litharge for causing an exothermic reaction to occur which is the sole means of heating the mixture, and agitating said mixture for a time sufficient to cause substantially all of the Barton litharge to be converted to red litharge.

RALPH L. SEABURY.
ROBERT A. DAILY.